United States Patent [19]

Shimasaki et al.

[11] 3,789,142

[45] Jan. 29, 1974

[54] FRAME SYNCHRONIZATION TECHNIQUE FOR SATELLITE ON-BOARD SWITCHING SYSTEMS

[75] Inventors: Nobuhiko Shimasaki, Rockville; Robert Rapuano, Gaithersburg, both of Md.

[73] Assignee: Communications Satellite Corporation, Washington, D.C.

[22] Filed: Mar. 26, 1971

[21] Appl. No.: 128,396

Related U.S. Application Data

[63] Continuation-in-part of Ser. No. 74,654, Sept. 23, 1970, abandoned.

[52] U.S. Cl. ................................ 179/15 BS, 325/4
[51] Int. Cl. ............................................ H04j 3/06
[58] Field of Search.. 179/15 BS; 325/4; 178/69.5 R

[56] References Cited

UNITED STATES PATENTS

| | | | |
|---|---|---|---|
| 3,639,838 | 2/1972 | Kuhn | 325/4 |
| 3,562,432 | 2/1971 | Gabbaro | 325/4 |
| 3,526,719 | 9/1970 | Puente | 325/4 |
| 3,320,611 | 5/1967 | Sekimoto | 325/4 |
| 3,541,553 | 11/1970 | Gubin | 325/4 |

*Primary Examiner*—Kathleen H. Claffy
*Assistant Examiner*—David L. Stewart
*Attorney, Agent, or Firm*—Sughrue, Rothwell, Mion, Zion and Macpeak

[57] ABSTRACT

Frame synchronization techniques for communications satellite systems employing spot-beam antennas and satellite on-board switching. An on-board switching matrix provides, as part of its switching processes, a common loop-closure time slot. In one technique, during the common loop-closure time slot, the on-board switching matrix connects on-board receive spot-beam antennas with each respective earth station in the system to the corresponding on-board transmit spot-beam antennas associated with each respective earth station. Each earth station transmits a synchronization unique word followed by information bursts. If each earth station receives a predetermined portion of its sync unique word via the loop circuit mode during the loop-closure time slot then the subsequent frame of bursts of information transmitted by each earth station is in proper frame synchronization for distribution of the information by the switching matrix. In a second technique wherein each on-board spot-beam illuminates a respective zone comprising several earth stations frame synchronization is provided amongst the several zones.

8 Claims, 14 Drawing Figures

INVENTORS

BY

ATTORNEYS

TIME RELATION AMONG UP/DOWN LINK BURST TRAINS AND TIME SLOTS OF ON-BOARD TDM SWITCH MATRIX

GENERAL BLOCK DIAGRAM OF EARTH STATION TDM BURST CONVERTER FOR TDM ON-BOARD ROUTING

SCHEMATIC BLOCK DIAGRAM OF TIME SLOT MEMORY

FRAME SYNCHRONIZATION TECHNIQUE FOR SATELLITE ON-BOARD SWITCHING SYSTEMS

BACKGROUND OF THE INVENTION

1. Field of the Invention

This invention relates generally to communications satellites, and more particularly to frame synchronization techniques for a satellite on-board switching multiple access systems.

2. Description of the Prior Art

Conventional communications satellites employ global coverage antennas and multiple transponders. A frequency division multiplex technique is used wherein various earth stations have assigned to them a set group of carriers. In order to prevent unwanted channel interference from occurring between earth stations covered by the same global antenna the system is designed such that no two earth stations may utilize the same carrier frequency at the same time.

As the frequency spectrum allocation in the 4 – 6 GHz region (which is the spectrum used for satellite communications) becomes less available considerations must be given to the use of millimeter-wave satellites. An advantage obtained with communicating in the millimeter wave region is that small antennas may be designed which will have highly directive spot-beam radiating patterns. This means that on-board the satellite there may be situated a spot-beam transmit and receive antenna for each earth station in the system. As such, each earth station is capable of simultaneously communicating on the same carrier with other stations on a time division basis via its own transmit and receive spot-beam antenna located on the satellite without interfering with the communications of another earth station. Such a system accomplishes a reuse of the frequency spectrum which results in a greater utilization of the frequency spectrum.

A system disclosing a multiple access satellite on-board switching matrix employing highly directive spot-beam antennas is disclosed in U. S. Pat. application Ser. No. 866,554 entitled "Satellite On-Board Switching" by Schmidt et al., filed on Oct. 15, 1969 and assigned to the assignee of the present invention. In this system each earth station transmits a frame of information comprising bursts of information. Each burst is time division multiplexed (TDM) onto a carrier and is destined for a selected remote earth station. The frame of bursts are relayed via the up-link path to the satellite where an on-board switching matrix accepts the frame via the spot-beam receive antenna associated with the transmitting earth station and redistributes the bursts of information to the proper destination earth stations via the respective transmit spot-beam antennas associated with each destination station. In a like manner, the frames of all other earth stations in the system are operated on to redistribute the information to the proper receiving earth stations. Because the bursts of information are time division multiplexed (TDM) on carriers which are space divided and therefore reuseable simultaneously by other earth stations, this type of system is known as a time division multiplexed-space division multiple access (TDM–SDMA) system.

In order for the programmed on-board switching matrix to properly redistribute the bursts of information from all the earth stations it is necessary that the bursts of information be frame synchronized with each other as they enter the satellite relay. Otherwise, the on-board switching matrix will improperly redistribute the bursts of information. A technique for frame synchronization is disclosed in the above filed application by Schmidt et al. With this technique one station is designated a reference station and transmits to the satellite a reference station synchronization signal. Immediately following this synchornization burst the satellite receives a unique word which is transmitted by each earth station and which uniquely identifies each respective earth station. Thereafter each station transmits its series of bursts of information destined for the other stations in the system. On-board the satellite the switching matrix subsystem is synchronized by detection of the reference synchronization segment of the reference station's transmission to operate on the subsequent incoming unique words and incoming bursts of information of all the earth stations. Switches in the satellite are programmed by on-board logic to send the reference station's synchronization segment simultaneously to all of the earth stations. The switches then connect the respective input spot beams of each earth station directly to the output spot beams corresponding to the same stations so that if the stations are in proper frame synchronization, each receives its own unique word; for example, station B receives the identification code word of station B. Thus, each station receives in succession the reference segment of the reference station's transmission followed by its own identification code word, i.e., unique word. The switches are programmed to then distribute the information bursts to the proper destination stations. The time-divided return of the outgoing signals solves the spot-beam frame synchronization problem. Each station, by receiving both the reference code word and its own code word can control the timing of its transmission to maintain frame synchronization.

The synchronization of the switching matrix sequence, as noted above, occurs in response to detection of the reference station sync segment. Detection of the sync segment is accomplished by first demodulating and detecting in the satellite the reference station's synchronization segment. After detection a pulse is sent to synchronize the operation of the switching matrix to properly distribute the incoming bursts of each earth station. A disadvantage with this technique is that it requires the use of both a demodulator and synchronization detector on-board the satellite. Therefore, complex and costly equipment is needed on-board the satellite to insure proper frame synchronization for ultimate redistribution of the information. The frame synchronization techniques disclosed in the present application have the advantage of not requiring any demodulating or synchronization detecting equipment on-board the satellite.

SUMMARY OF THE INVENTION

The techniques for acquiring frame synchronization with a satellite on-board switching matrix may be utilized in either a TDM–SDMA communications system or in a time division multiple access — space division multiple access (TDMA–SDMA) communications system, hereinafter described.

In a TDM–SDMA system for each earth station in the system there is located at the satellite a spot-beam transmit and receive antenna. Each earth station obtains proper frame synchronization information by the combination of the use of a synchronization unique word for each earth station and a common "loop-closure" time slot made on-board the satellite by a switching matrix. Each station transmits its own station identification word, i.e., synchronization unique word, followed by its information bursts. On board the satellite the switching matrix is programmed to provide the common loop-closure time slot at the start of each frame period wherein the switching matrix connects all satellite receive spot-beam antennas associated with each respective earth stations with the associated transmit spot-beam antennas for each respective earth station to form a closed loop of short duration. In this manner the sync unique word received by the satellite spot-beam receive antenna associated with a particular earth station is distributed to the spot-beam transmitting antenna associated with the same earth station so that the transmitting earth station will receive its own sync unique word.

The sync unique word is transmitted on the up-link side to the satellite where it is modulated by the common loop-closure time slot. If all earth stations are in proper frame synchronization the switching matrix will have closed the down-link spot beam antenna at a time such that each station will have received a predetermined part of the sync unique word or, in other words, there will be a degree of coincidence between the sync unique word and the loop-closure time slot at the satellite such that each earth station will have received the predetermined part of the transmitted sync unique word. However, if, for example, one station does not receive the predetermined part of its sync unique word, it will be an indication to that station that its information bursts are not in frame synchronization with the on-board switching matrix. The station which is not in frame synchronization will detect this condition and will then be able to alter the time of initiation of transmission such that it will receive the predetermined sync unique word. It will then be known that the information bursts following the sync unique word will be in proper frame synchronization with other stations in the system and that each burst will be in synchronism with the distribution sequence of the on-board switching matrix for subsequent proper redistribution of the transmitted information.

In a TDMA–SDMA system each spot beam receive and transmit antenna irradiates a zone comprising two or more earth stations. Using the principles heretofore described frame synchronization is acquired between each zone in order for the on-board switching matrix to properly redistribute information to the several zones. The earth stations within each zone acquire TDMA synchronization with the use of the sync unique word used to acquire frame synchronization.

With these techniques no on-board demodulating or synchronization detecting equipment is required. The switching matrix is merely preprogrammed to provide the common loop-closure time slot as part of the actual switching processes.

DESCRIPTION OF THE PREFERRED EMBODIMENT

Figure 1:
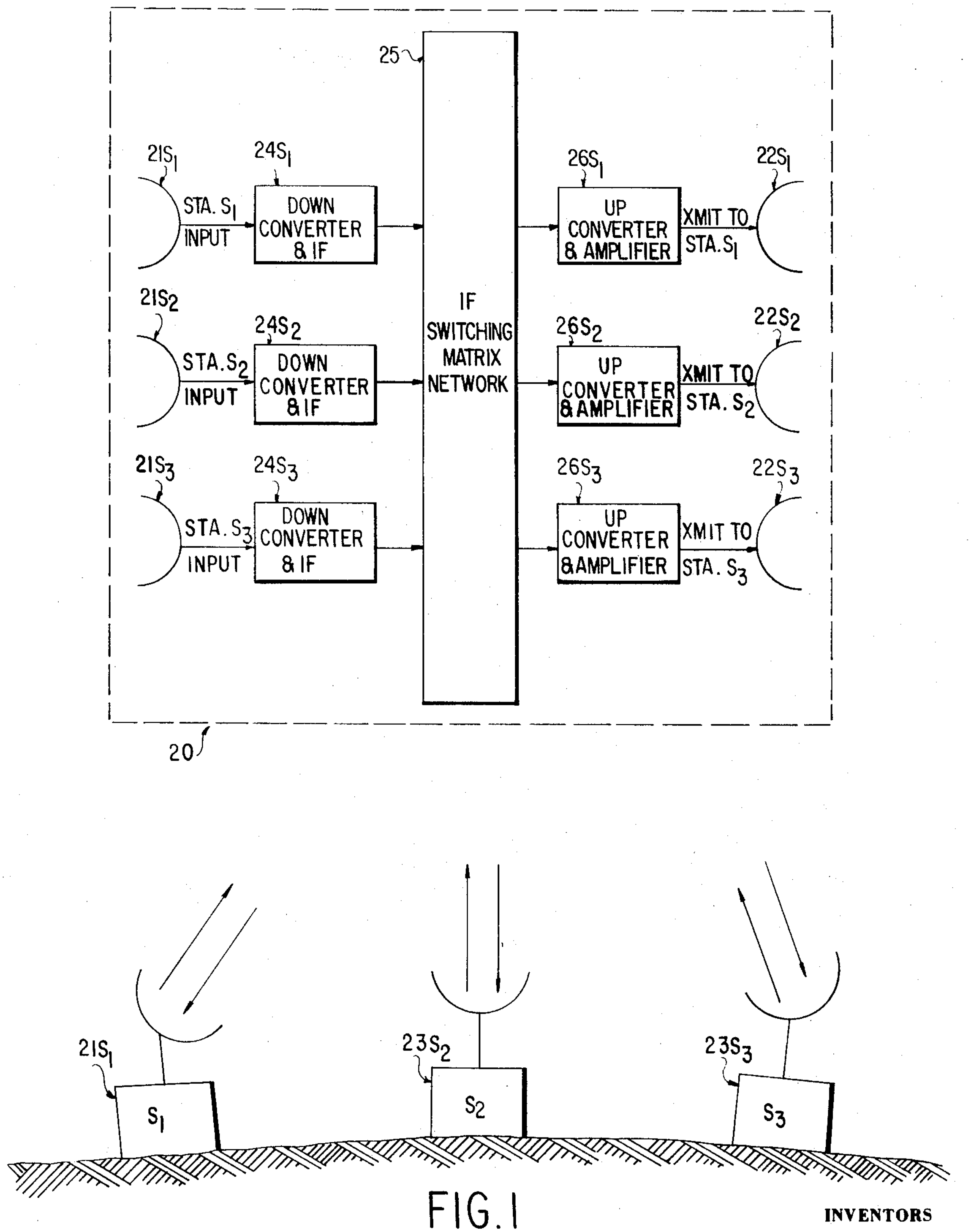
FIG. 1 is a block diagram of the overall TDM-SDMA satellite communications system employing on-board satellite switching.

Referring now to FIG. 1 there is shown a TDM–SDMA communications satellite system including three earth stations and which employs satellite on-board switching. The satellite 20 includes spot-beam antennas 21S$_1$ through 21S$_3$. These are pointed at respective earth stations 23S$_1$ to 23S$_3$; These are pointed at respective earth stations 23S$_1$ to 23S$_3$; each earth station being spaced from the others by a sufficient distance to enable it to communicate with its corresponding spot-beam antenna on the satellite 20 without interference from other earth stations. It is to be realized that any number of earth stations and associated spot-beam antennas may be part of the system and that only three earth stations are disclosed for purposes of discussion.

The up-link signals received by the spot-beam antennas 21S$_1$ to 21S$_3$ are connected to respective down-converters and IF subassemblies 24S$_1$ to 24S$_3$. The outputs of the down converters and IF subassemblies are then connected to an IF switching matrix network 25 which comprises the distribution subunit. Switching matrix network 25 is programmed to provide the common loop-closure time slot and to switch from origin grouping to destination grouping the information segments of a frame. For example, earth station 23S$_1$ will transmit, each frame period, its sync unique word following by a plurality of time-divided or sequential channel segments (origin grouping) each of which is destined for different earth stations 23S$_2$ and 23S$_3$. All of these voice channel segments from earth station $23S_1$ are received by the spot-beam antenna $21S_1$. It is then the function of the preprogrammed switching network 25 to appropriately return the sync unique word to station $23S_1$ and then to distribute each of the information bursts to the proper spot-beam transmitting antennas $22S_2$ and $22S_3$. The same operations hold true with respect to transmissions from the other earth stations so that the output of the switching network to the spot-beam transmitting antenna $22S_1$ comprises the sync unique word of station $23S_1$ followed by a group of channel segments intended for that station from earth stations $23S_2$ and $23S_3$ (destination grouping). The several outputs of the switching network 25 are connected to the several spot-beam transmitting antennas $22S_1$, $22S_2$ and $22S_3$ by way of respective up-converters $26S_1$, $26S_2$ and $26S_3$.

FIG. 2A shows the up-link format employed which results in the down-link format of FIG. 2B. Each input in FIG. 2A represents a transmission from a single earth station and occurs simultaneously in time at the satellite with the transmission of other stations. In the example shown, each frame is composed of one sync unique word and eight information bursts. Specifically shown is information in time slots 1–3; however, in a like manner time slots 4–8 may also be used for transmitting information to the other earth stations in the system. When frame synchronization has been achieved (by the use of the sync unique word in cooperation with the common loop-closure time slot, described in detail below) on-board the satellite the switching system 25 will be properly directing the non-overlapping information segments destined for a particular earth station to the satellite output spot-beam associated with that particular station. This is shown in FIG. 2B. Thus, all segments that were destined for station $S_1$, for example, in the transmit format shown in FIG. 2A are now grouped together in FIG. 2B.

At each station, the proper frame synchronization for a TDM–SDMA system is obtained by transmitting a sync unique word in the up-link data stream at the proper time and detecting it at the same earth station in the down-link beam path. On board the satellite the switching matrix at the beginning of each frame provides a common loop-closure time slot by connecting the receive spot-beam antenna of one station with its associated transmit spot beam antenna, thereby providing a loop-closure path wherein the particular earth station may receive its own sync unique word. The common loop-closure path, is of course, made for all other earth stations in the system simultaneously. The beginning of the loop-closure time slot also marks the beginning of the switching sequence on-board the satellite. Proper positioning of the sync unique word in the loop-closure time slot will insure that the information bursts will be properly distributed for transmission to the destined earth stations. As will hereinafter be more fully discussed the in-synchronism condition will depend on the degree of coincidence at the satellite between the sync unique word and the loop-closure time slot.

In FIG. 2C there is shown the common loop-closure time slot and the information burst time slots. In FIG. 2A there is shown for each earth station, by way of example, the synchronization unique word burst "AB" (before on-board switching) of a duration equal to the loop-closure time slot followed immediately by the eight information bursts. It is to be noted that the sync unique word "AB" need not actually be "AB" for each earth station but only that each sync unique word have the same characteristics so as to ensure proper synchronization. Each information burst is preceded by an earth station identification unique word UW for the purposes discussed in the previous mentioned application of Schmidt, et al. FIGS. 2A and 2C show the situations when the time frames from the earth stations are in proper time alignment with the on-board switching matrix. Thus, for example, having transmitted the sync unique word "AB" and having received the sync unique word "AB," the earth station will then know that its transmission will be in proper frame synchronization with the on-board switching matrix in order that its bursts of information will be properly distributed. In a like manner if each station in the system transmits a sync unique word "AB" and, due to the common loop-closure time slot, receives the sync unique word "AB," then there will be a situation such that every station in the system is transmitting its information bursts in frame synchronization with the on-board switching matrix. Should one station, after transmitting its synchronization burst, receive only part of the synchronization unique word, for example only "A," then it will know that its transmission is not in proper frame synchronization. Accordingly, it will know that its transmission is occurring too late in time with respect to the on-board switching matrix and with respect to the other stations in the system and it will therefore know to advance its transmission in time to accomplish frame synchronization.

Figure 2:
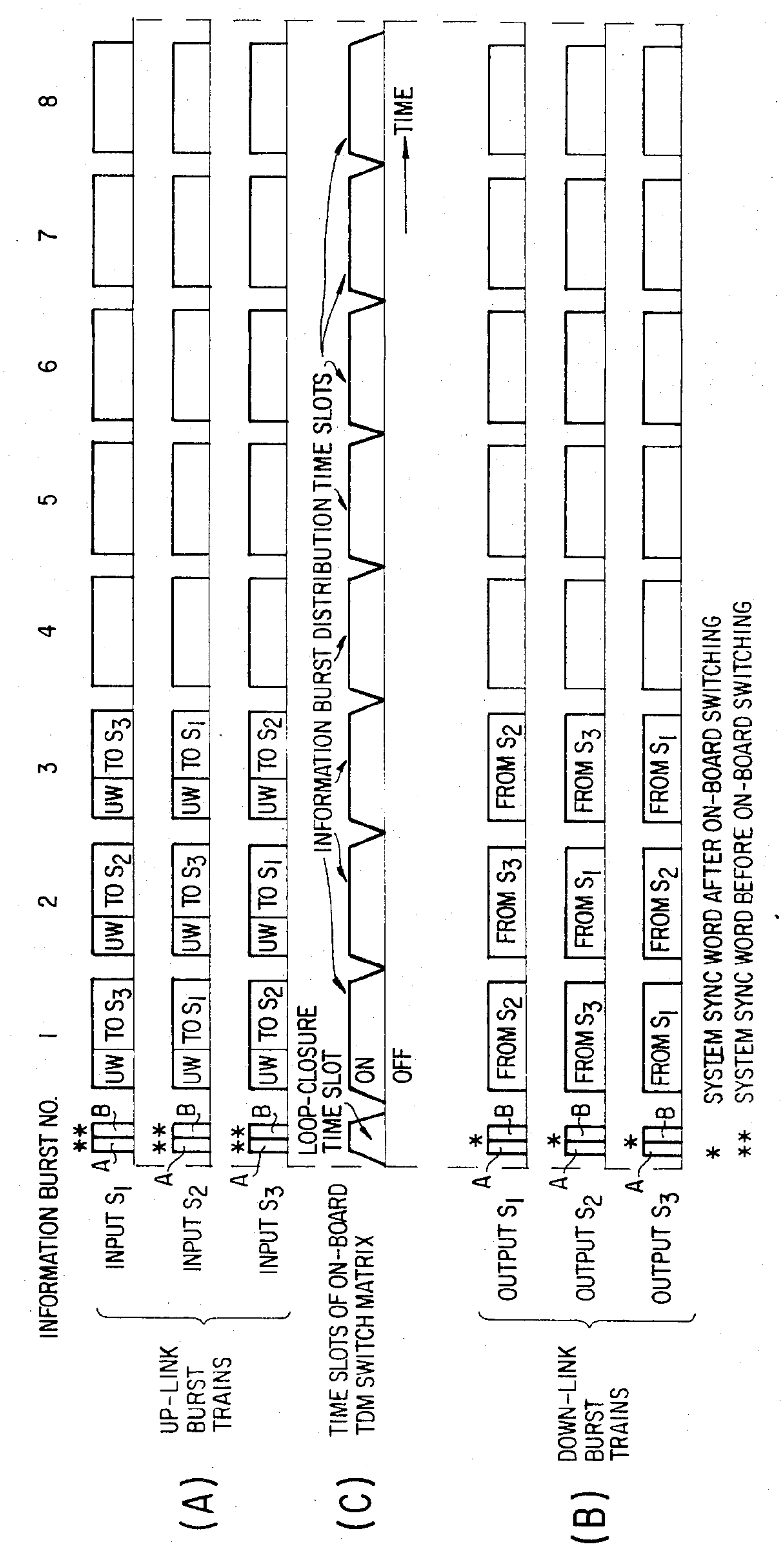
FIGS. 2A and 2B illustrate, respectively, the transmit and receive signal formats employed in the system shown in FIG. 1.
FIG. 2C in conjunction with FIGS. 2A and 2B shows the time relationship between the switching matrix on-off time slots and the up-down information burst train including the time relationship between the common loop-closure time slot and the synchronization unique word burst.
Figure 3:
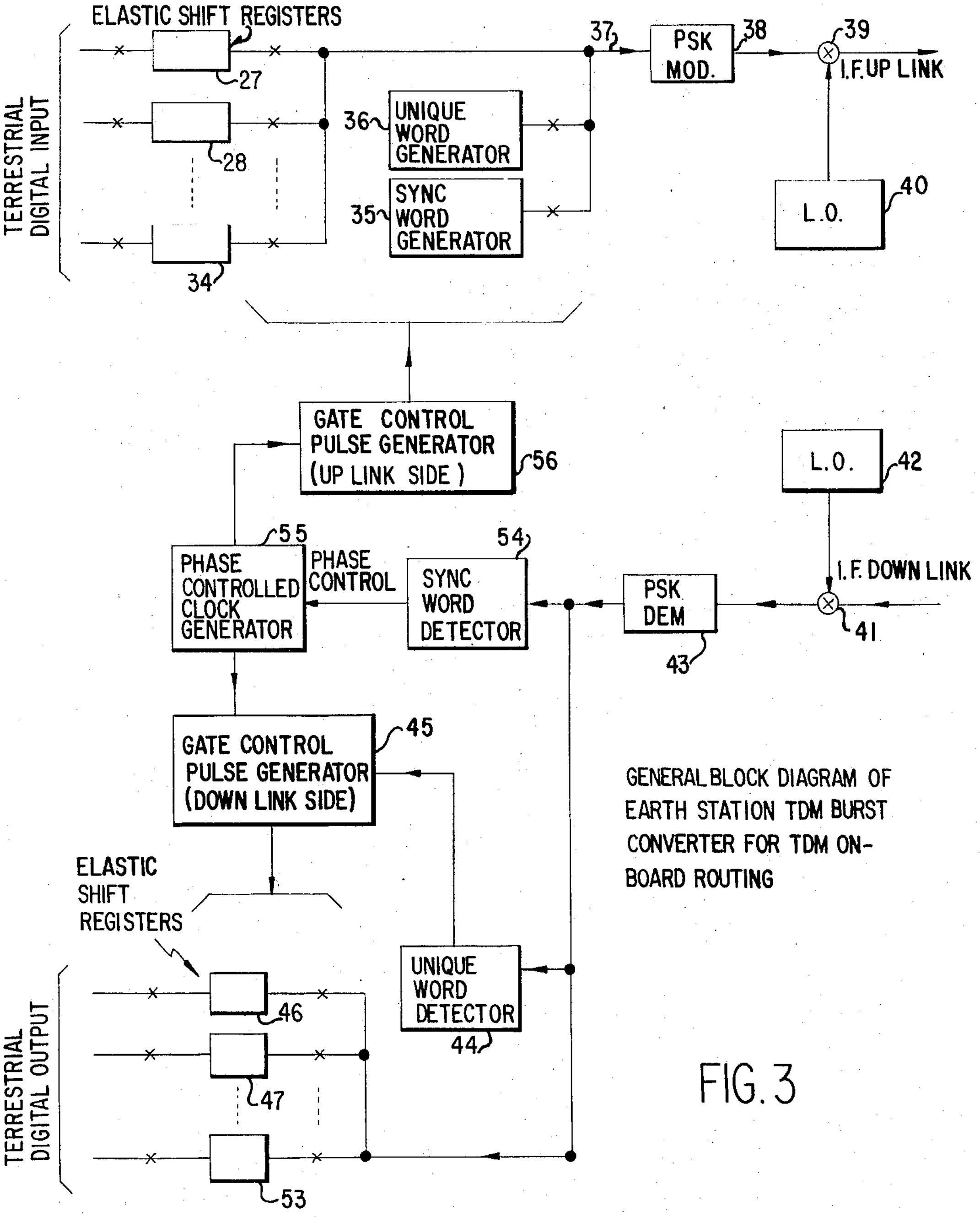
FIG. 3 is a diagram of an earth station TDM burst converter.

Referring to FIG. 3 the sync unique word, for example "AB," generated by a sync unique word generator 35 of a type well-known to one skilled in the art, is time division multiplexed with the eight information bursts from elastic shift registers 27–34. Prior to each information burst there is also multiplexed the unique word UW by the unique word generator 36. A complete sequence of information constitutes the time frame as shown in FIG. 2A. The frame of information is then fed via line 37 to a PSK (phase shift key) modulator 38 for modulation of a carrier as is well known in the art. After modulation the signal is mixed in mixer 39 with the frequency from local oscillator 40 and transmitted through the IF up-link to the satellite. The transmitted frame is then distributed by the on-board switching matrix, as already discussed, to first return the sync unique word information to the transmitting station via the loop-closure path followed by the information bursts destined for it from the other stations in the system. At the receiver the sync unique word is mixed in mixer 41 with the frequency from local oscillator 42, along with the distributed information bursts in order to recover the carrier. After demodulation in PSK demodulator 43 the unique word UW received at the beginning of each information burst is detected in unique word detector 44. The unique word detector 44 then sends a pulse to a gate pulse generator 45 which in turn gates the information bursts to the proper terrestrial digital outputs through 8 elastic shift registers 46–53 in accordance with the unique word UW detection. The sync unique word which has been received is detected in the sync unique word detector 54. If the detected word is, for example, "AB" then, having transmitted "AB" the transmitting earth station will know it is in frame synchronization and no further control is needed. However, if the sync unique word detected is "A" or "B" then the sync unique word detector 54 will emit a phase control signal which is then fed to phase controlled clock generator 55 of a type well known in the art. The clock generator 55 will then emit a pulse to a gate control pulse generator 56 which in turn will gate the outgoing transmitting information by either advancing the information bursts should the detected part of the sync unique word be "A" or by delaying the transmitted bursts should the detected part of the sync unique word be "B." This operation will occur until the received sync unique word detected in the sync unique word detector 54 is the word "AB," thereby indicating to the transmitting station that it is in frame synchronization with both the on-board switching matrix and the other properly synchronized earth stations in the system.

Since the sync unique word actually comprises two unique words "AB" the initial portion of each segment, i.e., the initial portion of segment A and the initial portion of segment B, must be devoted to a short preamble for carrier and clock recovery. Carrier and clock recovery is necessary at the earth station receiver in order to demodulate the sync unique word and to ultimately determine that portion of the sync unique word and to ultimately determine that portion of the sync unique word, i.e., "A," "B," "AB" actually being received.

Figure 4:
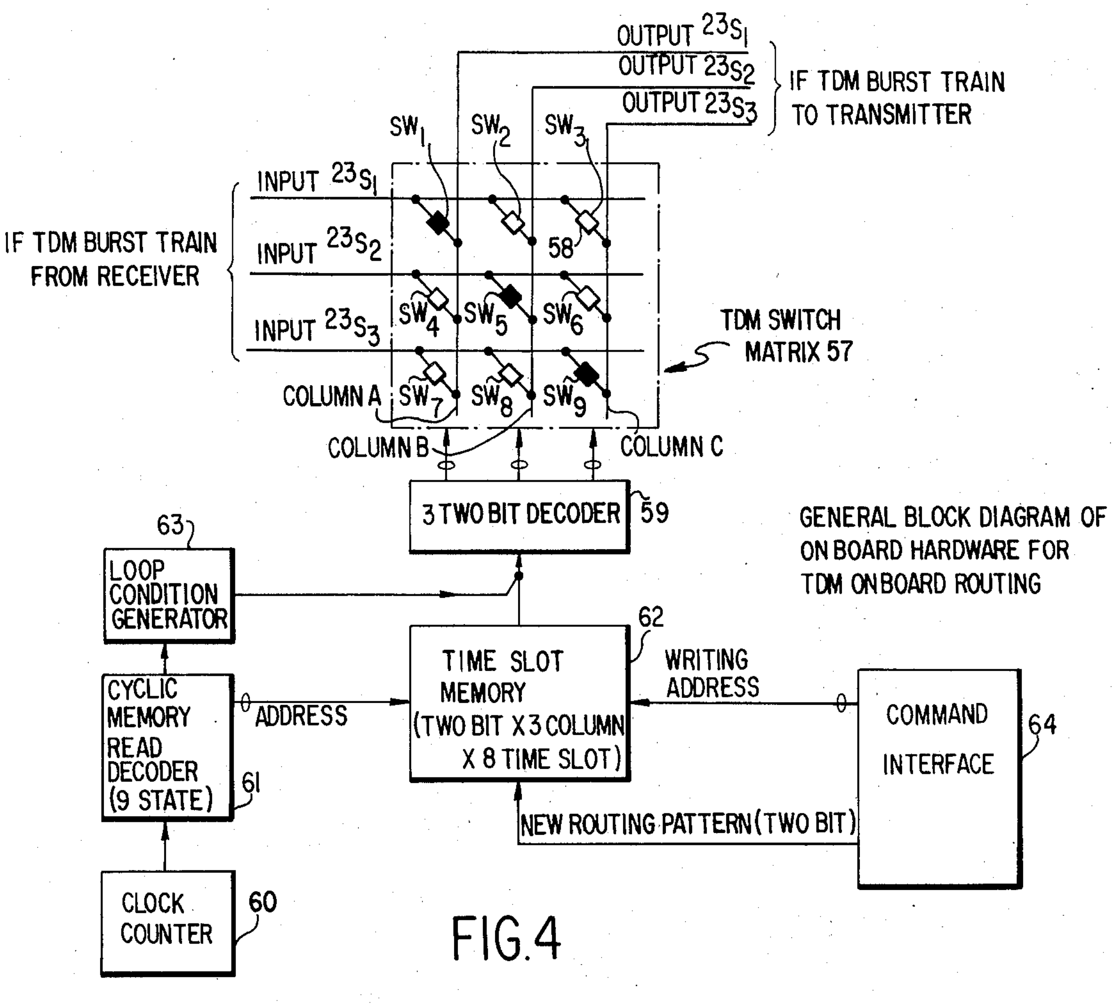
FIG. 4 is a schematic block diagram of on-board hardware for TDM on-board routing for the system in FIG. 1.

Referring to FIG. 4 there is shown a single 3 ×3 on-board TDM switching matrix 57. It is assumed that there are three earth stations, however, obviously the dimensions of the matrix will vary depending on the number of earth stations in the system. Each square 58 at the junctions of the matrix represents a switch SW1 – SW9 having as an input the corresponding row for each earth station $23S_1$ – $23S_3$. The outputs of all the switches in a single column are combined to form a single output line. The several switches SW1 – SW9 are controlled by three two-bit decoders in decoder 59, one for each column of switching matrix 57. The 3 decoders in decoder 59 each have 3 output lines, each line connected to a respective one of the switches in its particular column.

Figure 5:
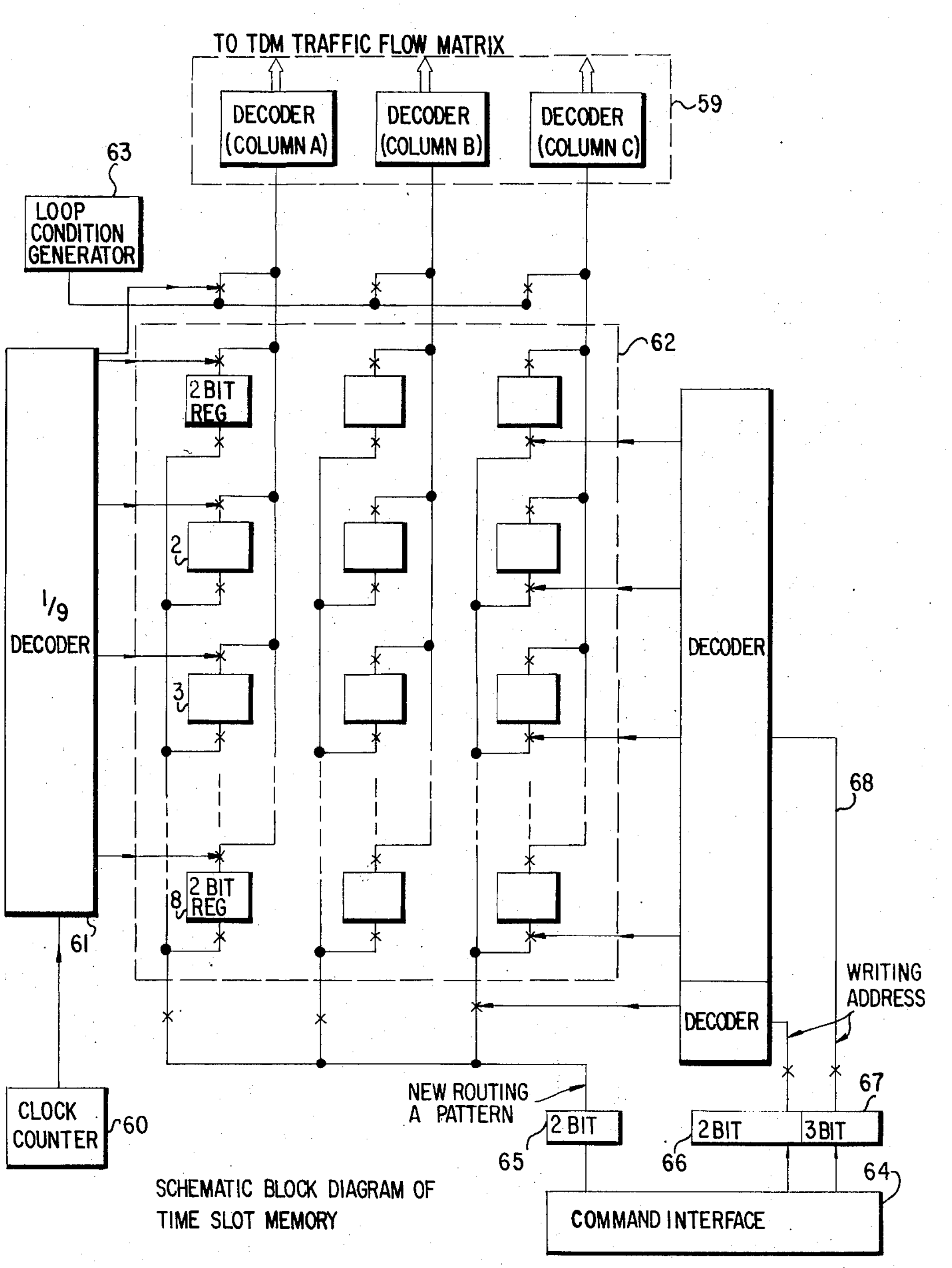
FIG. 5 is a schematic block diagram of certain hardware of FIG. 4.

A schematic block diagram of the time slot memory 62 and decoder 59 is shown in FIG. 5. Assuming a time frame of eight information time slots and one loop-closure time slot, clock counter 60 feeds clock pulses into a nine state cyclic memory read decoder 61. The purpose of the nine state decoder 61 is to cyclically feed eight pulses to time slot memory 62 (one for each information burst) and one pulse to loop condition generator 63 for providing the common loop-closure time slot. Time slot memory 62 comprises three columns, one for each column in switching matrix 57, with eight two-bit registers in each column, each register defining a particular switch 58.

At the start of each frame, loop condition generator 63 will be enabled to present a code word to all three two-bit decoders in decoder 59. Decoder 59 will then close switches SW1, SW5, SW9 to provide the common loop-closure time slot. Thereafter, in series, eight pulses will be presented to time slot memory 62 with each pulse enabling three two-bit registers, one in each column. Each two-bit register in decoder 59 will then decode the output of each column from time slot memory 62 to thereafter close the appropriate switches. For example, during information burst 1 of the time frame, a pulse from cyclic memory read decoder 61 is sent to time slot memory 62 to enable the number 1 shift register in columns A, B and C, respectively. The number 1 shift register of column A then feeds a 2-bit code word representing switch SW4 to the 2-bit decoder 59 for column A. Decoder 59 then decodes the input from the number 1 shift register and sends an output pulse which closes switch SW4. In a like manner and at the same time switches SW8 and SW3 are closed. The simultaneous closing of the three switches SW4, SW8 and SW3 will route incoming information from station S2 to station S1, station S3 to station S2 and station S1 to station S3, respectively as illustrated in FIG. 2. During the next burst time, burst time 2, the number 2 shift registers will be enabled and switches SW7, SW2 and SW6 will be simultaneously closed to route information as shown in FIG. 2. However, it can be seen, for example, that if the number 2 shift registers of time slot memory 62 are encoded to represent the same switches as the number 1 shift registers then the destination grouping may be varied. Thus, the destination grouping is determined by the order of 2-bit codes in the respective columns in time slot memory 62. Also, as should readily be apparent, time allocations of these groupings may be determined by the number of times a 2-bit code is successively repeated in the memory.

Both the order of the 2-bit code and the number of successive repetitions thereof in memory 62 may be controlled by information derived from a satellite command subsystem. Referring to FIG. 5 there is shown a command interface 64 having a new routing pattern 2-bit register 65 and a writing address having a 2-bit register 66 and a 3-bit register 67. The new routing pattern 2-bit register designates any switch SW1-9, the 2-bit register 66 specifies a particular column in the time slot memory 62 and the 3-bit register 67 specifies any one of the eight rows in time slot memory 62. Upon command from a command earth station a new routing pattern is accomplished by placing the 2-bit code representing a designated switch SW1-9 in the proper row and column of time slot memory 62. Proper placement of the 2-bit code in register 65 is carried out by decoding in decoder 68 the 2-bit row designation and the 3-bit column designation. This enables a gate associated with a 2-bit register in time slot memory 62 and allows the new 2-bit code designating a switch SW1-9 to be stored in the proper 2-bit register of memory 62.

Figure 6A:
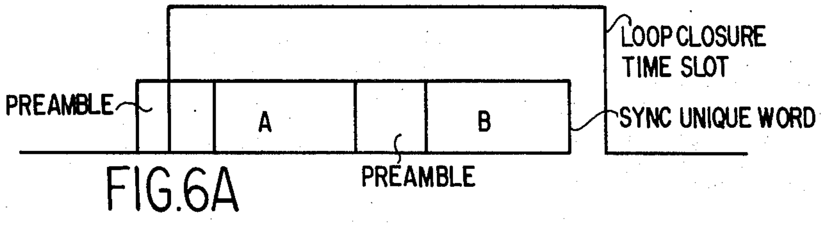
FIG. 6A is a diagram of a specific time relationship between the loop-closure time slot and the synchronization unique word of the specific embodiment.

Referring to FIG. 6A there is shown a situation where the sync unique word "AB" is within an acceptable region of coincidence with the loop-closure time slot and therefore can be detected at the receiver; yet the information bursts following the sync unique word will not be in precise frame synchronization with the on-board switching matrix. This is due to the fact that the sync unique word is not in precise coincidence with the loop-closure time slot and therefore the information bursts will not be in precise coincidence with the information bursts distribution time slots provided by the switching matrix. Though this small error is tolerable and would not have any substantial effect in distributing the information two alternative embodiments are now disclosed which more precisely result in proper frame synchronization.

Figure 6B:
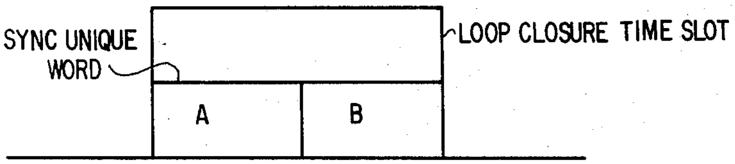
FIGS. 6B and 6C are diagrams of alternative embodiments of synchronization unique words showing their tiem relationship with the loop-closure time slot.

Whereas the method for frame synchronization already described employs a PSK sync unique word consisting of two parts "AB" with each part preceded by a preamble, the sync unique word of one alternative method consists of two parts "AB," each part being frequency shift keyed (FSK) and requiring no preamble, as is illustrated in FIG. 6B. Further, there is an abrupt transition between the two parts, i.e., the first bit of part "B" appears at the clock period following the last bit of part "A." The offset or frequency shift between part "A" and part "B" may be about 5 MHz. When the sync unique word is centered within the loop-closure time slot, thereby indicating proper frame synchronization, the output of two filters at the earth station, with one filter tuned to part "A" and the other filter tuned to part "B," will be equal. If the output of the filters are different it is an indication that the sync unique word is either leading or lagging depending on which filter produces the higher output. This difference can then be used to control the phase of the phase controlled clock generator 55 as noted previously. In this manner by detecting equality between the two parts of the sync unique word a more precise analysis can be made for proper frame synchronization. The reason for this is that the indication of equality means that at the satellite the sync unique word "AB" of the frequency shift key type is completely coincident with the loop-closure time slot. This means that the subsequent information bursts are synchronized with the information burst distribution time slots on board the satellite. If there is an indication of inequality then, for example, part of "A" and all of "B" may be detected which, looking at FIG. 6B, means that the sync unique word has shifted to the left and there exists a time space between the end of "B" and the end of the loop-closure time slot. The subsequent information bursts will also be shifted to the left by an equal amount when looking at the information bursts time slots of FIGS. 2A and 2B thereby effecting appropriate redistribution of the information bursts.

Figure 6C:
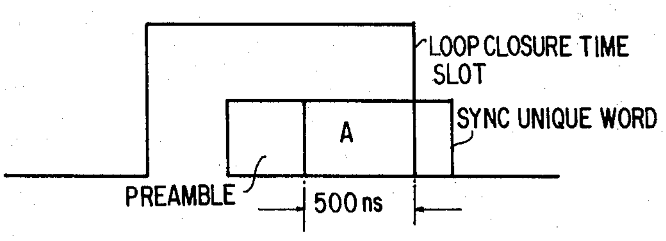

In a second alternative embodiment as shown in FIG. 6C the sync unique word is simply a single PSK word with a preamble. The exact length of the word is not critical but it should generally be about one-half the length of the loop-closure time slot. In the implementation of FIG. 6C, the sync unique word detector is actually a correlation detector, and thus performs integration. The single sync unique word is detected in the correlation detector so arranged that the amplitude of the resultant output is proportional to the number of correlated bits which are integrated. Thus, if the sync unique word is truncated by the loop-closure time slot, i.e., not in coincidence at the satellite with the time slot, the number of bits which add together is reduced, and therefore the amplitude of the correlation detector output is reduced. If the number of bits passed during the loop-closure time slot is increased, as by advancing the time of transmission of the unique word, then more bits are added together to give a larger detector amplitude.

Proper placement of the leading edge of the single PSK sync unique word will be insured by measuring the amplitude of the received sync unique word (as determined by the length of the received sync unique word) and comparing it with the value it should have if the word were properly positioned. For example, if the single PSK sync unique word is properly positioned when it is 500 nanoseconds long then a voltage representing that length can be set as the standard. Should a longer or shorter unique word be received due to improper initiation of transmission then greater or lesser voltages would be generated which would then be compared to the reference voltage. Any difference between the voltages could then be used to produce an error signal which would then be used to control phase controlled clock generator 55.

Figure 7:
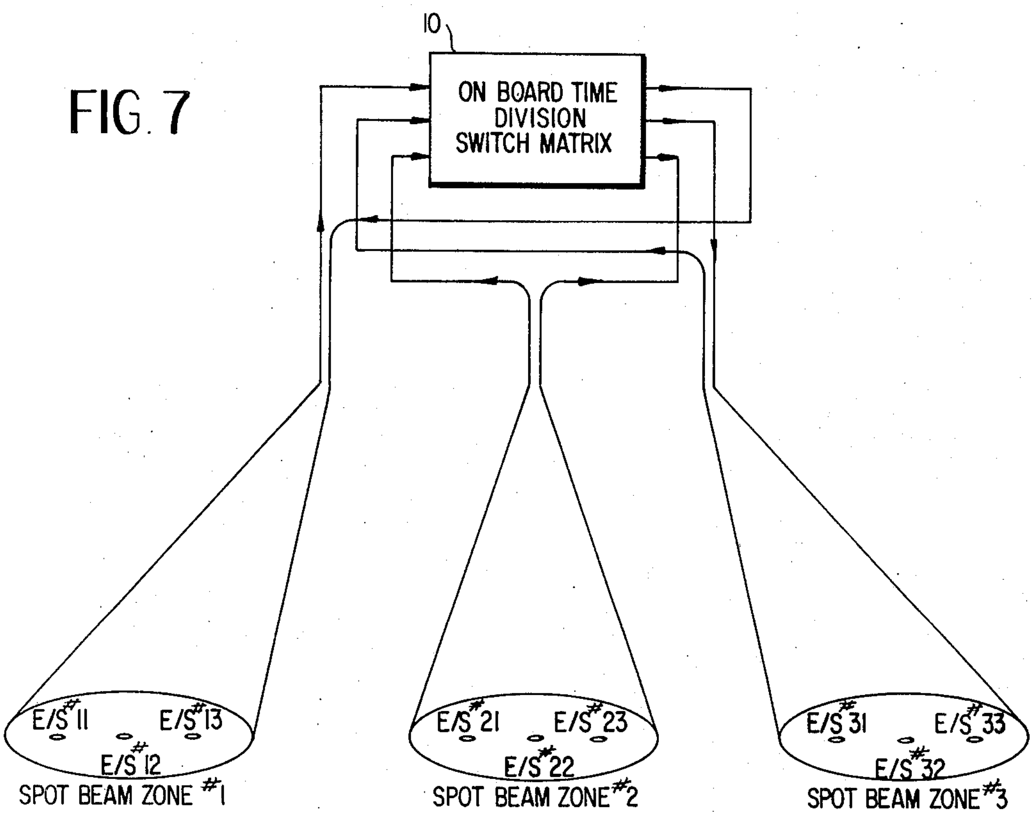
FIG. 7 is a block diagram of a TDMA–SDMA satellite communications system.

Referring to FIG. 7 there is shown a block diagram of a TDMA–SDMA communications satellite system employing an on-board switching matrix. The TDMA–SDMA system, by way of example, has three spot-beam receive and three spot-beam transmit antennas (not shown) located at satellite 10. Each spot-beam receive antenna and its associated transmit antenna irradiates a respective spot beam zone 1, 2 and 3. Each zone comprises, by way of example, three earth stations which access the satellite 10 in a time division multiple access (TDMA) fashion. Each zone 1, 2 and 3 accesses the satellite 10 in a space division multiple access (SDMA) fashion similar to manner in which each earth station accesses the satellite 20 in the TDM–SDMA system. The function of the on-board switching matrix is to route information in one time frame from one zone to a pre-destined zone. In order for the on-board switching matrix to properly route the information bursts from each zone two types of synchronizations must be acquired as will now be described.

Figures 8A, 8B, 8C:
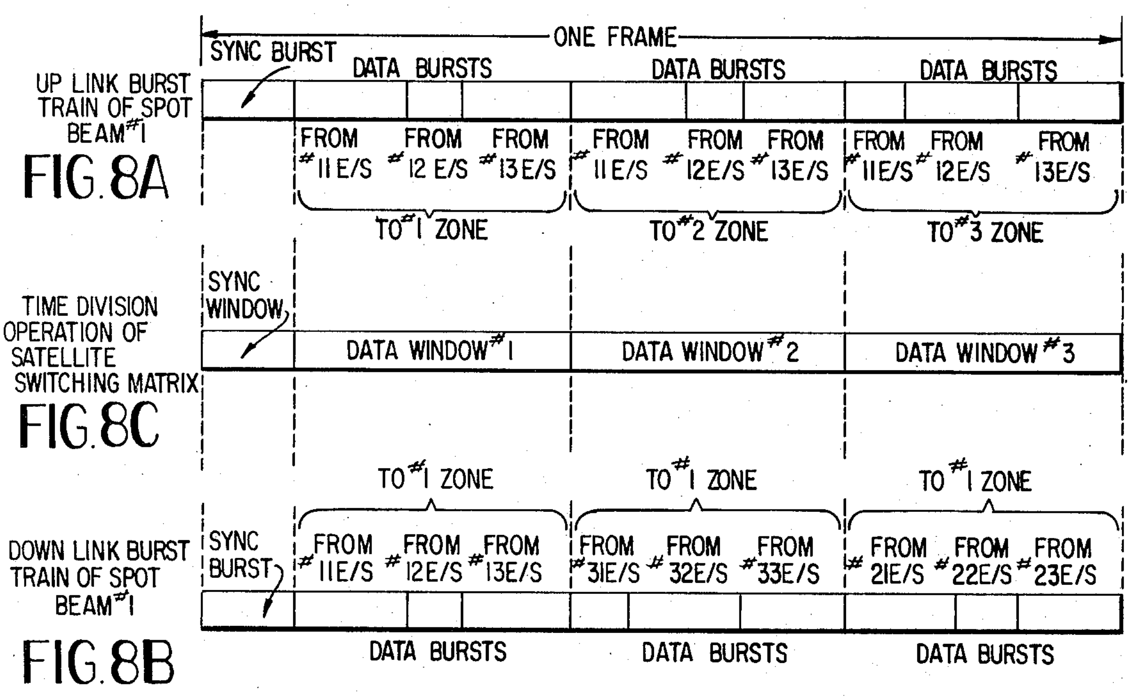
FIGS. 8A and 8B illustrate, respectively, the transmit and receive signal formats of one zone employed in the system shown in FIG. 7.
FIG. 8C in conjunction with FIGS. 8A and 8B shows the time relationship between the switching matrix on-off time slots and the up-down information train including the time relationships between the common loop-closure time slot and the synchronization unique word burst.

The first type of synchronization required is frame synchronization between a respective zone 1, 2 or 3 and the satellite on-board switching matrix. Referring to FIG. 8A a frame of information will comprise, from earth station 11, 12 and 13 of zone 1, for example, information bursts intended for zone 1 followed by information bursts intended for zone 2 followed by information bursts intended for zone 3. In a like manner the frames from each respective zone access the satellite will include information bursts intended for the various zones 1, 2 and 3. The frame format of the various zones is pre-arranged with respect to the switching sequence of the on-board matrix such that when the respective frames from each zone are in frame synchronization there will be a proper routing of the transmitted information. Frame synchronization is acquired when the frames from each respectife zone access the satellite 10 at exactly the same time.

The second type of synchronization relates to TDMA synchronization which must be acquired amongst the earth stations of any one zone. Referring to FIG. 8A the transmissions from earth stations 11, 12 and 13 of zone 1 must access the satellite 10 in a proper time relationship such that the transmissions from one earth station do not overlap the transmissions of another earth station. Actually, the technique for TDMA synchronization may take the form of any well-known synchronization technique such as that disclosed in a publication entitled "A Satellite Time Division Multiple Access Experiment," IEEE Transactions on Communications Technology, Vol. Com–16, No. 4, 1968, by Sekimoto and Puente. However, as will be hereinafter discussed, the problem of obtaining TDMA synchronization amongst the earth stations of each respective zone may be solved by merely utilizing one specific frame synchronization technique.

In accordance with a preferred embodiment of the invention for use in a TDMA–SDMA system each earth station in a respective zone transmits an FSK type of sync unique word (of the type heretofore discussed in relation to the TDM–SDMA system) at a time such that it is in synchronization with the common loop-closure time slot provided by the on-board switching matrix of satellite 10. During the loop-closure time slot the on-board switching matrix connects the receive spot-beam antenna of a zone to the associated transmit antenna of that zone thereby enabling reception by the earth stations of that zone of the FSK type sync unique word transmitted by each earth station. Each earth station in a zone is assigned different frequencies for its sync unique word. For example, earth station 11 would be assigned frequencies $F_1$, and $F_2$, earth station 12 would be assigned freuqencies $F_3$ and $F_4$, and earth station 13 would be assigned frequencies $F_5$ and $F_6$. Filtering equipment at each earth station 11, 12 and 13 enables each earth station to extract its own FSK sync unique word and consequently enable each earth station to detect the degree of coincidence of the sync unique word with respect to the loop-closure time slot. In the manner heretofore discussed in relation to the TDM–SDMA system if an earth station has not received the proper FSK sync unique word it may then adjust the transmission time of its sync unique word to be in coincidence with the common loop-closure time slot. Each earth station in each zone of the system performs the same operation thereby obtaining information concerning the time of occurrence of the loop-closure time slot provided by the on-board switching matrix. The earth stations in each respective zone may also use the frequencies $F_1$ –$F_6$ since the zones access the satellite in an SDMA fashion.

Having acquired SDMA frame synchronization information (by knowing the time of occurrence of the loop-closure time slot) the earth stations in each respective zone may now acquire TDMA synchronization in the following manner. Referring to FIG. 8A which shows the frame format for zone 1, the order in which earth stations 11, 12 and 13 transmits their bursts with respect to one another is prearranged. Also prearranged is the length of burst for each earth station 11, 12, 13. Accordingly, earth station 11 will transmit its burst immediately upon detection of its properly received sync unique word. Earth station 12 will commence its transmission at a time, after reception of its sync unique word, equal to the burst length of earth station 11. In a like manner earth station 13 would commence its burst transmission at a time equal to the burst times of earth station 11 and 12 measured from the time of reception of its sync unique word. Each zone in the TDMA–SDMA system performs the same operations. In this manner both TDMA and SDMA synchronization is acquired with the use of the FSK type sync unique word.

Other techniques for acquiring SDMA and TDMA synchronization in an TDMA-SDMA system are conceivable. For example, to acquire frame synchronization each spot beam zone 1, 2, 3 may designate a reference earth station for each zone, for example, earth station 11 for zone 1, earth station 21 for zone 2 and earth station 31 for zone 3. These reference stations transmit a PSK type of sync unique word of the types previously disclosed. Each reference earth station will then place its PSK sync unique word in the loop-closure time slot provided by the on-board switching matrix of satellite 10 in a manner heretofore discussed with respect to the TDM–SDMA system. During the loop-closure time slot the on-board switching matrix distributes the PSK sync unique word from each respective reference earth station to all the earth stations within the respective zones. Each earth station in a respective zone, upon reception of the properly positioned PSK sync unique word, will then know the time at which it may commence its transmission in the prearranged frame format. For example, in a manner previously discussed with respect to the FSK type sync unique word technique, after reception of the properly positioned PSK sync unique word by all earth stations including the reference station in zone 1, earth station 11 would commence transmission followed by earth stations 12 and 13.

In another approach each earth station within a zone transmits its own PSK type sync unique word within the loop-closure time slot. The switching matrix is programmed to return the PSK sync unique word to the respective earth stations during the loop-closure time slot. Again TDMA synchronization would be acquired in a manner heretofore discussed. However, one problem associated with this technique is that since all the PSK sync unique words of each respective zone would be processed during the loop-closure time slot at the same time interference will result. An alternative to this last approach is to utilize a time sharing scheme. For example, with three earth stations in each zone each station would transmit its PSK sync unique word only once per three frames.

What is claimed is:

1. A satellite communications system of the type comprising a plurality of earth stations adapted to transmit signals to one another via a satellite relay transponder, the improvement comprising, a. a plurality of receiver means on said satellite directed to receive signals transmitted toward said satellite from earth stations located in a plurality of zones, respectively, on said earth, b. a like plurality of transmitter means on said satellite directed to transmit signals toward earth stations located in a plurality of zones, respectively, on said earth, c. interconnection means for interconnecting said plurality of receiver means with selected transmitter means to complete communication paths between selected zones on said earth during each of several brief time intervals of a recurring time division multiplex frame period, a particular connection between one receiver means and one transmitter means forming a communication path between earth stations in the respective zones of said one receiver means and said one transmitter means, d. frame control means on said satellite for causing said interconnection means to periodically interconnect for a brief time, less than said time division multiplex frame period, each receiver means with the respective transmitter means serving the same zone, whereby during said brief time of each said period closed loops are formed between each zone and said satellite to cause signals received from any zone to be transmitted back to said zone, and e. pattern control means operating at the same periodic rate as said frame control means for controlling said interconnecting means to cause interconnections during the remainder of each said period in accordance with a prearranged pattern.

2. A satellite communications system as claimed in claim 1 further comprising at an earth station, a. earth station frame control means for causing transmission of signals towards said satellite in a periodic frame format, said frame period of said format being the same as said period of said satellite frame control means, b. frame synch signal generating means cooperating with said earth station frame control means for including a recognizable frame synch signal in a predetermined position in said transmitted periodic format, c. means for receiving signals transmitted from said satellite towards an earth zone in which said earth station is located, d. means for detecting the portion of said recognizable frame synch signal which passes through said satellite during said brief time and is included in the signals received by said earth station, and e. means responsive to said detected portion for phase shifting said earth station frame control means to bring said recognizable frame synch signal in coincidence at said satellite with said brief time.

3. A satellite communications system as claimed in claim 2 wherein said recognizable frame synch signal comprises first and second distinguishable portions transmitted one immediately after the other, and the total duration of said recognizable frame synch signal is substantially the same as said brief time.

4. A satellite communications system as claimed in claim 3 wherein said means responsive to said detected portion comprises means for determining the relative amounts of said distinguishable portions contained in said detected portion.

5. A satellite communications system as claimed in claim 4 wherein said distinguishable portions are distinguished from each other by their respective carrier frequencies.

6. A satellite communications system as claimed in claim 2 wherein said means responsive to said detected portion comprises a correlation detector for correlating said detected portion with a replica of said frame synch signal.

7. A satellite communications system as claimed in claim 2 wherein said earth station frame control means comprises means for arranging said transmitted signals in time divided destination groups within each frame, said time divided frame pattern being coincident with said prearranged interconnection pattern of said pattern control means.

8. A satellite communications system as claimed in claim 2 wherein at least one of said zones covers a group of earth stations.

* * * * *

UNITED STATES PATENT OFFICE
CERTIFICATE OF CORRECTION

Patent No. 3,789,142 Dated January 29, 1974

Inventor(s) Nobuhiko SHIMASAKI et al

It is certified that error appears in the above-identified patent and that said Letters Patent are hereby corrected as shown below:

Column 4, line 22 - delete "tiem" and insert -- time -- lines 42-43 - delete "These are pointed at respective earth stations $23S_1$ and $23S_3$;" (first occurrence)

Column 7, lines 23-24 - delete "and to ultimately determine that portion of the sync unique word" (first occurrence)

Column 10, line 36 - after "frames" insert -- of information -- line 36 - after "from" delete "each respective zone access the satellite" and insert -- zones 2 and 3 (not shown) --

Signed and sealed this 9th day of July 1974.

(SEAL)
Attest:

McCOY M. GIBSON, JR.
Attesting Officer

C. MARSHALL DANN
Commissioner of Patents